United States Patent
Harada et al.

(10) Patent No.: US 10,841,823 B2
(45) Date of Patent: Nov. 17, 2020

(54) USER TERMINAL, RADIO COMMUNICATION SYSTEM AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/500,170

(22) PCT Filed: Jun. 24, 2015

(86) PCT No.: PCT/JP2015/068212
§ 371 (c)(1),
(2) Date: Jan. 30, 2017

(87) PCT Pub. No.: WO2016/017328
PCT Pub. Date: Feb. 4, 2016

(65) Prior Publication Data
US 2017/0265095 A1    Sep. 14, 2017

(30) Foreign Application Priority Data

Jul. 31, 2014  (JP) .................................. 2014-156894

(51) Int. Cl.
*H04W 24/10*  (2009.01)
*H04W 16/14*  (2009.01)
(Continued)

(52) U.S. Cl.
CPC ........... *H04W 24/10* (2013.01); *H04W 16/14* (2013.01); *H04W 16/32* (2013.01);
(Continued)

(58) Field of Classification Search
CPC . H04W 16/14; H04W 72/1215; H04W 24/10; H04W 16/32; H04W 74/006;
(Continued)

(56) References Cited

U.S. PATENT DOCUMENTS

| | | |
|---|---|---|
| 2014/0036881 A1 | 2/2014 | Kim et al. |
| 2015/0181453 A1* | 6/2015 | Chen ..................... H04L 1/0026 370/252 |

(Continued)

OTHER PUBLICATIONS

International Search Report issued in corresponding application No. PCT/JP2015/068212 dated Aug. 18, 2015 (4 pages).

(Continued)

*Primary Examiner* — Marcus Hammonds
(74) *Attorney, Agent, or Firm* — Osha Bergman Watanabe & Burton LLP

(57) ABSTRACT

In order to measure and report reception quality appropriately in a radio communication system (LAA system) supporting LBT with an unlicensed band, the present invention provides a user terminal capable of communicating with a radio base station using a first frequency carrier configured with LBT (Listen Before Talk). The user terminal has: a control section that, when a beacon reference signal of a connecting cell is detected by LBT, determines that a channel of the connecting cell is in an idle state ($LBT_{idle}$) and controls to measure reception quality in an $LBT_{idle}$ subframe; an obtaining section that obtains a measurement result of the reception quality in the LBT period; and a transmission section configured to transmit the measurement result.

3 Claims, 17 Drawing Sheets

(51) Int. Cl.
*H04W 16/32* (2009.01)
*H04W 88/02* (2009.01)
*H04W 74/08* (2009.01)
*H04W 74/00* (2009.01)

(52) U.S. Cl.
CPC ......... *H04W 74/006* (2013.01); *H04W 74/08* (2013.01); *H04W 74/0816* (2013.01); *H04W 88/02* (2013.01)

(58) Field of Classification Search
CPC . H04W 74/08; H04W 74/0816; H04W 88/02; H04W 72/042
See application file for complete search history.

(56) References Cited

U.S. PATENT DOCUMENTS

| | | | | |
|---|---|---|---|---|
| 2015/0264699 | A1* | 9/2015 | Fwu | H04L 5/003 370/329 |
| 2015/0365152 | A1* | 12/2015 | Frenne | H04L 5/001 370/252 |
| 2016/0183204 | A1* | 6/2016 | Seo | H04L 5/0048 455/127.2 |
| 2016/0192332 | A1* | 6/2016 | Koorapaty | H04L 5/005 370/329 |

OTHER PUBLICATIONS

Written Opinion of the International Searching Authority issued in corresponding application No. PCT/JP2015/068212 miled Aug. 18, 2015 (4 pages).

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).

3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

NTT DOCOMO, Inc., "Discussion on issues related to measurement and synchronization in LAA"; 3GPP TSG RAN WG1 Meeting #80, R1-150418; Athens, Greece; Feb. 9-13, 2015 (4 pages).

Extended European Search Report issued in corresponding European Patent Application No. 15828150.1, dated Mar. 6, 2018 (7 pages).

\* cited by examiner

USER TERMINAL, RADIO COMMUNICATION SYSTEM AND RADIO COMMUNICATION METHOD

TECHNICAL FIELD

The present invention relates to a user terminal, a radio communication system and a radio communication method in next-generation mobile communication systems.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). In LTE, as multi access schemes, an OFDMA (Orthogonal Frequency Division Multiple Access)-based scheme is used for downlink and an SC-FDMA (Single Carrier Frequency Division Multiple Access)-based scheme is used for uplink.

For the purposes of achieving further broadbandization and higher speed, successor systems to LTE have been also studied. These successor systems to LET are sometimes called "LTE advanced" or "LTE enhancement" (hereinafter referred to as "LTE-A").

In the LTE-A system, HetNet (Heterogeneous Network) has been also studied in which a macro cell is formed having a wide coverage area of about several kilo meter radius, and a small cell (for example, pico cell, femto cell or the like) having a local coverage area of about several ten meter radius is formed within the macro cell (see Non Patent Literature 2). In the HetNet environment, it has been considered that the macro cell (macro base station) and the small cell (small base station) use not only carriers of the same frequency band but also carriers of different frequency bands.

Further, in a future radio communication system (Rel. 12 or later), the LTE system has been considered as operating not only in a licensed frequency band but also in an unlicensed frequency band (license-not-required frequency band) (which system is called LTE-U: LTE Unlicensed). The licensed band is a band that is permitted to be used exclusively by a specific operator (carrier), while the unlicensed band is a band in which a radio base station is able to be installed without restriction to a specific operator.

As the unlicensed band, a 2.4 GHz or 5 GHz band, in which Wi-Fi (registered trademark) and Bluetooth (registered trademark) is usable, and a 60 GHz band, in which milli-meter wave is usable, have been considered to be used. This unlicensed band has been also considered to be applied to a small cell.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2
Non-Patent Literature 2: 3GPP TR 36.814 "E-UTRA Further advancements for E-UTRA physical layer aspects"

SUMMARY OF THE INVENTION

Technical Problem

The existing LTE is premised on operation with the licensed band. Accordingly, operators are assigned mutually different frequency bands. On the other hand, as for the unlicensed band, its use is not limited to specific operators, unlike the licensed band. Use of the unlicensed band is also not limited to specific radio systems (for example, LTE, Wi-Fi and so on), unlike the licensed band. Accordingly, the frequency band used in LAA by a certain operator may overlap a frequency band used in LAA system or Wi-Fi system by another operator.

When operating with the unlicensed band, it may be assumed that operation is made between different operators or non-operators without synchronization, coordination and/or cooperation. In addition, between different operators or non-operators, installation of a radio access point (AP) or a radio base station (eNB) is expected to be performed without mutual coordination and/or cooperation. In this case, in the unlicensed band, there may occur mutual interference that is different from that of the licensed band case.

Then, in the Wi-Fi system operated with the unlicensed band, there has been adopted Carrier Sense Multiple Access/Collision Avoidance (CSMA/CA) based on Listen Before Talk (LBT) mechanism. Specifically, there is used one method of executing listening (CCA: Clear Channel Assessment) before transmission by each transmission point (TP), access point (AP) or a user terminal, and carrying out transmission only when there is no signal that exceeds a predetermined level. When reception power measured by LBT exceeds a given threshold, a standby time is provided as given randomly and after the standby time, listening is carried out again.

In the LAA system, like in the Wi-Fi system, there may be a method of stopping transmission in accordance with a result of listening (LBT and random back-off). For example, in the unlicensed band cell, listening is carried out before signal transmission and it is checked whether another system (for example, Wi-Fi) or another LAA transmission point is in communication. Then, the LBT result is used as a basis to control whether to transmit a signal or not.

When the listening results in that no signal is detected from another system or LAA transmission point, communication with a user terminal in the unlicensed band is established. On the other hand, when the listening results in detection of a signal from another system or LAA transmission point, the processing is performed such as transition to another carrier by DFS (Dynamic Frequency Selection), transmit power control (TPC), stand (stop) transmission, and so on.

Since the reception quality reflects an interference level, the reception quality in the $LBT_{idle}$ state, that is, when LBT results in no signal being detected from a transmission point of another LAA or another system and the reception state in the $LBT_{busy}$ state, that is, when LBT results in a signal being detected from a transmission point of another LAA or another system are expected to be greatly different from each other. Accordingly, in conventional measurement and report of the reception quality by the user terminal, the measurement result may vary depending on the interference level at the measurement timing, which causes deterioration in measurement accuracy and the reception quality is not able to be measured appropriately.

The present invention was carried out in view of the foregoing and aims to provide a user terminal, a radio communication system and a radio communication method that are capable of, in a radio communication system (LAA system) supporting LBT with the unlicensed band, measuring and reporting reception quality appropriately.

Solution to Problem

The present invention provides a user terminal capable of communicating with a radio base station using a first frequency carrier configured with LBT (Listen Before Talk), the user terminal comprising: a control section that, when a beacon reference signal of a connecting cell is detected by LBT, determines that a channel of the connecting cell is in an idle state ($LBT_{idle}$) and controls to measure reception quality in an $LBT_{idle}$ subframe; an obtaining section that obtains a measurement result of the reception quality in the LBT period; and a transmission section configured to transmit the measurement result.

TECHNICAL ADVANTAGE OF THE INVENTION

According to the present invention, it is possible to, in a radio communication system (LAA system) supporting LBT with the unlicensed band, measure and report reception quality appropriately.

DESCRIPTION OF EMBODIMENTS

With reference to the accompanying drawings, an embodiment of the present invention will be described below.

In the present embodiment, a frequency carrier in which LBT is not configured is explained as a licensed band and a frequency carrier in which LBT is configured is explained as an unlicensed band, but this is not intended for limiting the present invention. In other words, the present invention is applicable to any frequency carriers in which LBT is configured, irrespective of the licensed band or the unlicensed band.

As scenarios of a radio communication system (LAA) operating LTE in the unlicensed band, there are expected a plurality of scenarios for using LTE in unlicensed band, such as carrier aggregation (CA), dual connectivity (DC) and stand-alone. For example, assume a macro cell using a licensed band of, for example, 800 MHz, and a small cell using an unlicensed band of, for example, 5 GHz. Here, cells supporting carrier aggregation and dual connectivity are located to have partially overlapping coverage areas.

Figure 1:
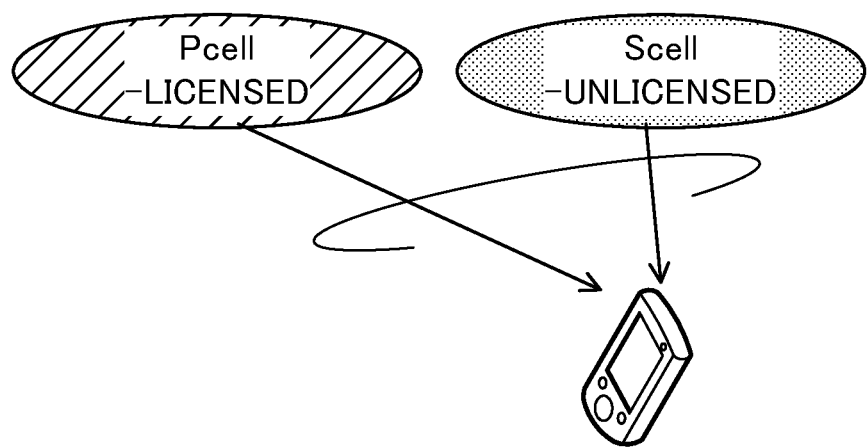
FIG. 1 is a diagram illustrating an example of the mode of operating LTE in the unlicensed band.

In this case, for example, as illustrated in FIG. 1, there is expected to be a scenario in which carrier aggregation or dual connectivity is applied assuming the macro cell using the licensed band is a primary cell (PCell) and the small cell using the unlicensed band is a secondary cell (SCell).

Figure 2A:
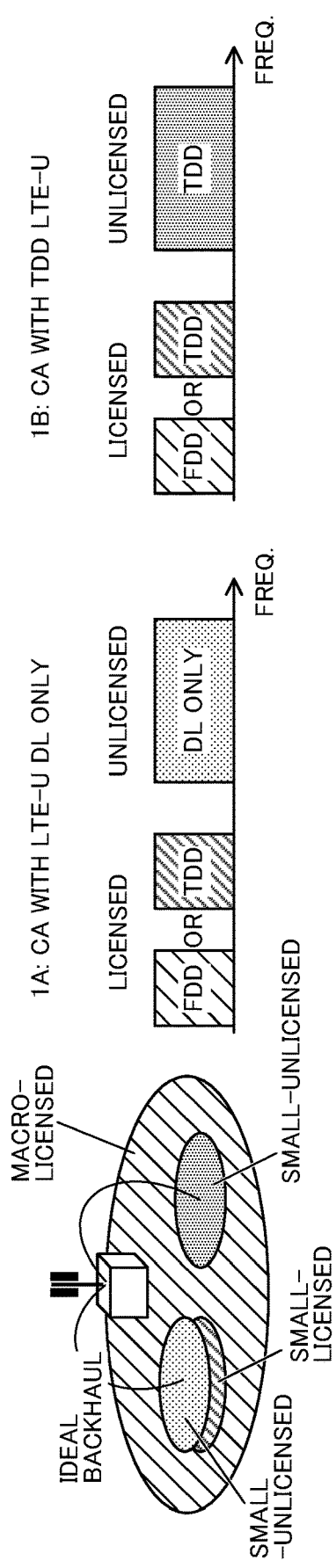
FIG. 2 provides diagrams illustrating a plurality of scenarios of the mode using LTE in the unlicensed band.

FIG. 2A illustrates a scenario in which carrier aggregation is applied using licensed and unlicensed bands. Carrier aggregation is a technique of aggregating a plurality of component carriers (component carrier is also called "CC", "carrier", "cell" and so on) into a broad band. For example, each CC has a bandwidth of maximum 20 MHz and when maximum five CCs are aggregated, a broad band of maximum 100 MHz can be achieved. When carrier aggregation applies, a scheduler of one radio base station controls scheduling of a plurality of CCs.

In the example illustrated in FIG. 2A, carrier aggregation is applied assuming that the macro cell using the licensed band or the small cell using the licensed band is a primary cell, while the small cell using the unlicensed band is a secondary cell.

In scenario 1A, the primary cell is the macro cell or small cell operating in the FDD band (carrier) or TDD band and the secondary cell is the small cell using the unlicensed band as a carrier dedicated for downlink (DL) transmission. In scenario 1B, the primary cell is the macro cell or small cell operating in the FDD band or TDD band and the secondary cell is the small cell operating in the unlicensed band as TDD.

Figure 2B:
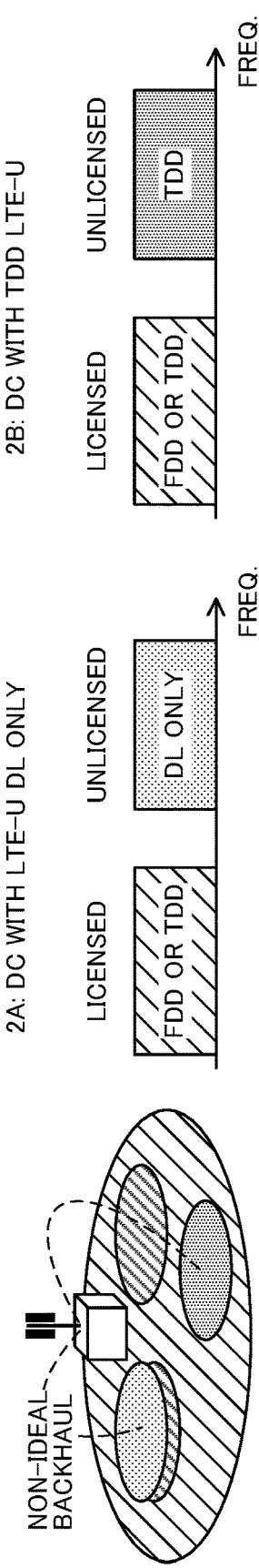

FIG. 2B is a scenario in which dual connectivity is applied using the licensed and unlicensed bands. Dual connectivity is identical in that a plurality of CCs are aggregated into a broad band. However, in the carrier aggregation, cells (or CCs) are connected to each other via ideal backhaul, and coordinated control with quite small delay is possible, while in dual connectivity, cells are connected to each other via non-ideal backhaul with not-negligible delay time. Accordingly, in dual connectivity, cells are operated by different base stations, and different cells (CCs) of different frequencies operated by different base stations are aggregated into a broadband. When dual connectivity applies, a plurality of schedulers are provided independently, and each of the schedulers is configured to control scheduling of its serving one or more cells (CCs). In dual connectivity, carrier aggregation may be applied per scheduler provided independently.

In the example illustrated in FIG. 2B, dual connectivity is applied assuming that the macro cell using the licensed band is a primary cell and the small cell using the unlicensed band is a secondary cell.

In scenario 2A, the primary cell is the macro cell or the small cell operating in the FDD band or TDD band and the secondary cell is the small cell using the unlicensed band as a carrier dedicated for DL transmission. In scenario 2B, the primary cell is the macro cell or the small cell operating in the FDD band or TDD band, while the secondary cell is the small cell operating in the unlicensed band for TDD.

Figure 2C:
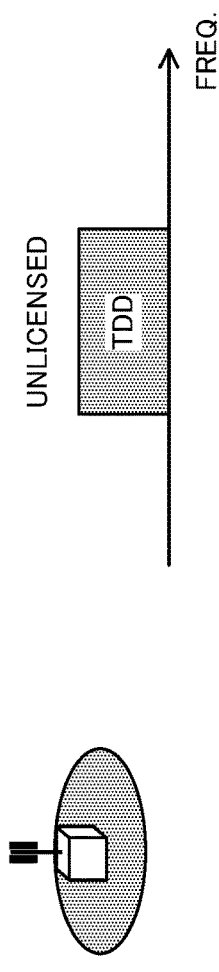

In the example illustrated in FIG. 2C, stand-alone is applied in which a cell operating LTE with the unlicensed band stands alone. In scenario 3, the unlicensed band is TDD band.

In LTE using the unlicensed band (LAA-LTE), in order to achieve fair frequency share between with other RAT (Radio Access Technology) and LAA-LTE operator, the LBT function is possibly introduced into LAA-LTE.

Assume that LBT is carried out and signal transmission is performed only when channel is unoccupied. If the channel continues to be in the busy state ($LBT_{busy}$), detection of a LAA cell and transmission of reference signals for measurement and synchronization are not performed for some time. Accordingly, when the channel is changed into the idle state ($LBT_{idle}$), communication with the LAA cell cannot be started immediately.

Figure 3:
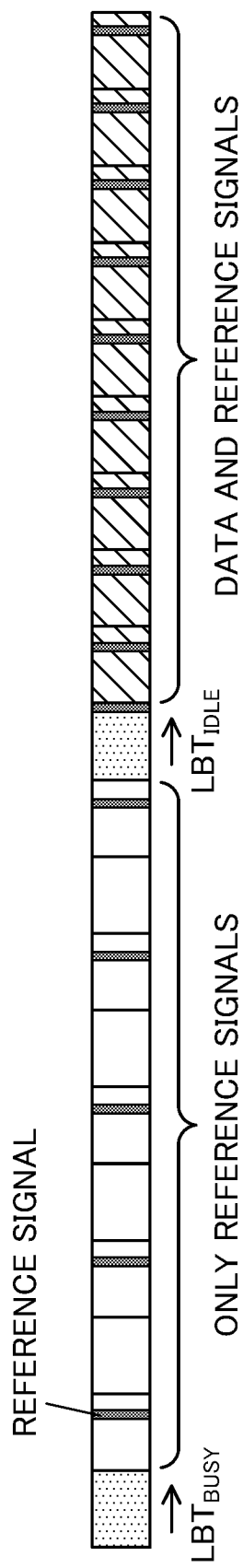
FIG. 3 is a diagram for explaining LBT-exempt transmission.

Then, as illustrated in FIG. 3, it is expected that, irrespective of an LBT result whether or not the channel is busy or idle, a part of reference signals is transmitted while preventing interference in low-density transmission (LBT-exempt transmission).

Generally, the user terminal receives reference signals for reception quality measurement over a plurality of time samples and preforms synthesizing and averaging processing. In the example illustrated in FIG. 3, if the user terminal performs measurement at any timing, the user terminal may monitor both of a reference signal transmitted in the $LBT_{idle}$ state and a reference signal transmitted in the $LBT_{busy}$ state and perform synthesizing and averaging processing.

Figure 4:
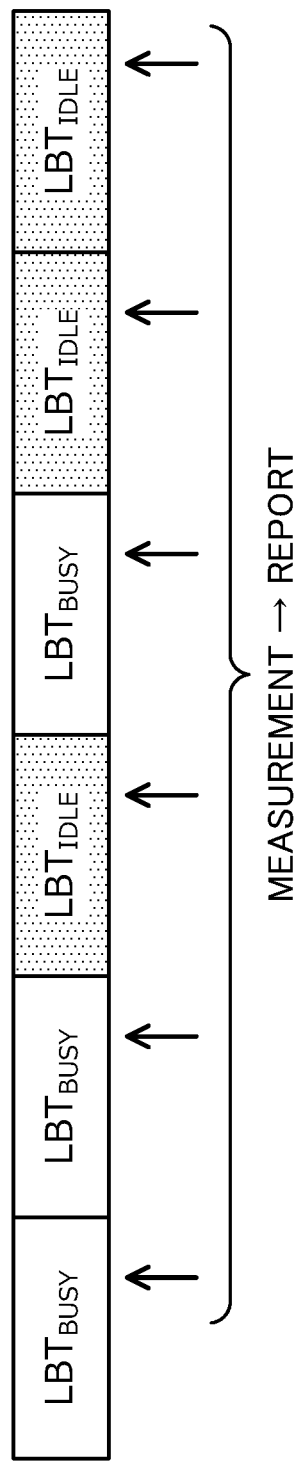
FIG. 4 is a diagram for explaining measurement and reporting of reception quality by the user terminal.

Even when the user terminal reports per measurement, the user terminal may report without distinction between reporting of a measurement result in the $LBT_{idle}$ and reporting of a measurement result in the $LBT_{busy}$ (see FIG. 4).

However, since the reception quality reflects an interference level, the reception quality in the $LBT_{idle}$ state and the reception state in the $LBT_{busy}$ state are expected to be greatly different from each other. For example, in the $LBT_{busy}$ state, there is expected to be great interference due to existence of another system. Accordingly, in conventional measurement and report of the reception quality by the user terminal, the measurement result may vary depending on the interference level at the measurement timing, which causes deterioration in measurement accuracy and the reception quality is not able to be measured appropriately.

On the other hand, when introducing LBT in the LAA-LTE, the inventors of the present invention have found a method for carrying out measurement and reporting of reception quality appropriately.

According to this method, measurement of reception quality in the $LBT_{busy}$ state and measurement of reception quality in the $LBT_{idle}$ state are carried out separately. In other words, the user terminal needs to identify the idle state ($LBT_{idle}$) and the busy state ($LBT_{busy}$) of the channel.

The user terminal is able to identify an LBT result in the connecting base station, that is, the channel state by whether or not a beacon reference signal (BRS) or another reference signal is detected.

When Detecting a Beacon Reference Signal (BRS)

Figure 5:
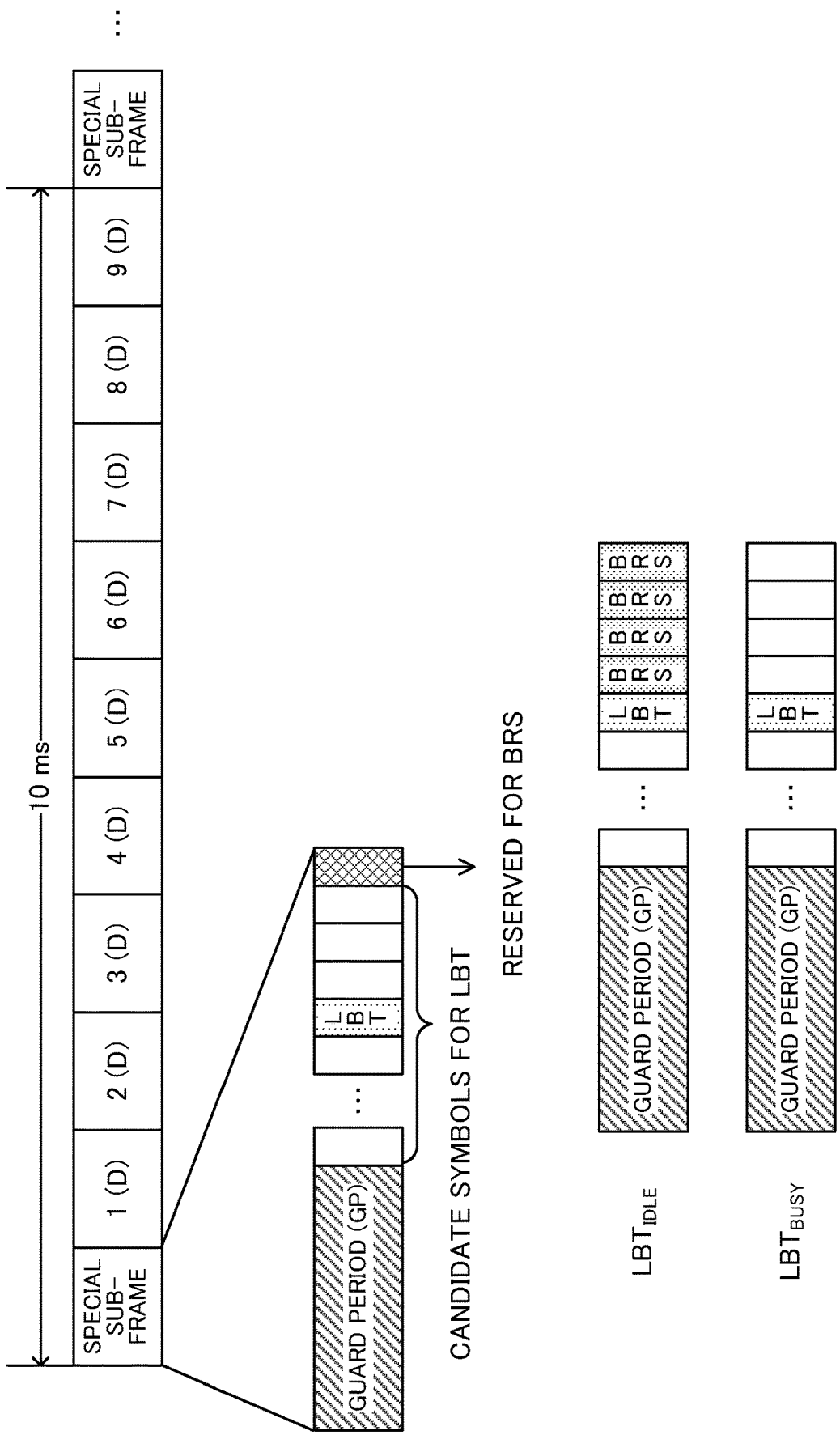
FIG. 5 is a diagram for explaining a beacon reference signal (BRS)

FIG. 5 illustrates an example of downlink LBT in a base station in scenarios 1A, 2A (see FIG. 2). The frame length is 10 [ms], and includes at least one LBT special subframe. This LBT special subframe is a newly defined subframe and is different from a special subframe in the legacy TDD UL-DL configuration.

The LBT special subframe includes a guard period (GP) and the remaining part corresponds to LBT candidate symbols to carry out LBT and candidate symbols to transmit BRS. The guard period may vary depending on the number of required LBT candidate symbols or the guard period may be omitted. Or, a part of the guard period may be used for downlink signal transmission like DwPTS (Downlink Pilot Time Slot) of the TDD special subframe. The base station selects, for LBT, one symbol or a plurality of symbols from the LBT candidate symbols. Further, in the $LBT_{idle}$ state, the base station can use the beacon reference signal (BRS) as channel reserve. Each base station may select a symbol to execute LBT randomly from the candidate symbols with even probability or the probability of selection for each symbol may vary depending on QoS (Quality of Service).

As illustrated in FIG. 5, when the channel is regarded as $LBT_{idle}$, a beacon reference signal (BRS) is transmitted after the LBT symbol. With this transmission, the channel is occupied for DL data transmission until the next LBT special subframe. The beacon reference signal (BRS) is transmitted over the entire bandwidth and using one OFDM symbol at the minimum. If there remain multiple OFDM symbols after the LBT symbol, the beacon reference signal (BRS) is transmitted repeatedly using these symbols. As the beacon reference signal (BRS) is configured to be transmitted repeatedly, the beacon reference signal (BRS) is able to be used commonly depending on the location of the LBT symbol and thereby, the baseband circuit configuration of the base station is able to be simplified.

As illustrated in FIG. 5, when the channel is regarded as $LBT_{busy}$, the beacon reference signal (BRS) is not transmitted.

As illustrated in FIG. 5, the last symbol of the LBT special subframe may be reserved for the beacon reference signal (BRS). That is, LBT may not be performed in the last symbol of the LBT special subframe.

In this case, the last OFDM symbol is used for transmission of the beacon reference signal (BRS) when the LBT result indicates the idle state or is muted when the LBT result indicates the busy state. When LBT is carried out in the last symbol, the beacon reference signal (BRS) is not able to be transmitted even in $LBT_{idle}$. Accordingly, neighbor base stations cannot be informed that the base station obtains a transmission opportunity. On the other hand, when performing the LBT in a symbol other than the last symbol, the beacon reference signal (BRS) is to be transmitted if it is in the $LBT_{idle}$ state. Accordingly, the operation becomes different depending on whether the LBT is carried out in the last symbol or another symbol. However, if the last symbol in the LBT special subframe is reserved for the beacon reference signal (BRS), the same operation is performed in all cases, thereby achieving the interference suppression effect by the beacon reference signal (BRS).

Since the beacon reference signal (BRS) is transmitted in the $LBT_{idle}$ state, the user terminal is able to identify the LBT result of the connecting base station, that is, the idle state or the busy state of the channel, by detecting the beacon reference signal (BRS).

The beacon reference signal (BRS) may be any of legacy reference signals CRS (Cell-specific Reference Signal), CSI-RS (Channel State Information Reference Signal) and DRS (Discovery Reference Signal), or combination of any of them. The beacon reference signal (BRS) may be a new cell-specific signal. The beacon reference signal (BRS) may be a signal including LAA cell ID or other broadcast information as a message.

The beacon reference signal (BRS) may be configurable to be optimized depending on the area such as Japan, Europe or United States of America. The beacon reference signal (BRS) may be configured to be used not only to indicate the LBT result, but also to measure either or both of RSRP (Reference Signal Received Power)/RSRQ (Reference Signal Received Quality) and CSI. That is, the beacon reference signal (BRS) may be used as a reference signal for CSI measurement or RRM (Radio Resource Measurement) measurement in the $LBT_{idle}$ state.

RRM/CSI measurement reference signal to transmit may vary between in the $LBT_{idle}$ state and in the $LBT_{busy}$ state. In this case, the user terminal is able to identify $LBT_{idle}$ or $LBT_{busy}$ based on a pattern of the measurement reference signal, without detecting the beacon reference signal (BRS).

When detecting the beacon reference signal (BRS) to identify the $LBT_{idle}$ state or the $LBT_{busy}$ state, the user terminal may perform the operation other than RRM/CSI measurement. For example, when the user terminal is not able to detect the beacon reference signal (BRS) and recognizes the $LBT_{busy}$ state, the user terminal may perform searching of another LAA carrier or cell. When the user terminal detects the beacon reference signal (BRS) and recognizes the $LBT_{idle}$ state, the user terminal may perform reception of PDCCH or EPDCCH. The PDCCH/EPDCCH reception operation may be skipped other than when the user terminal detects the beacon reference signal (BRS) and recognizes the $LBT_{idle}$ state.

When Detecting Another Reference Signal

When the beacon reference signal (BRS) is not configured, the user terminal is able to identify the channel idle state or busy state by detecting a reference signal included in each subframe, for example, CRS. For example, when the user terminal detects CRS, the user terminal recognizes the $LBT_{idle}$ state. Or, the user terminal recognizes data transmission from the base station. When the user terminal does not detect CRS, the user terminal recognizes the $LBT_{busy}$ state. Or, the user terminal recognizes that data is not transmitted from the base station.

The user terminal executes different functions depending on the recognized LBT result. For example, the user terminal performs RSSI (Receive Signal Strength Indicator)/RSRQ measurement and report in accordance with the recognized LBT result. Or, the user terminal performs CSI measurement and report in accordance with the recognized LBT result. Or, the user terminal performs another function in accordance with the recognized LBT result.

RRM Measurement

Figure 6A:
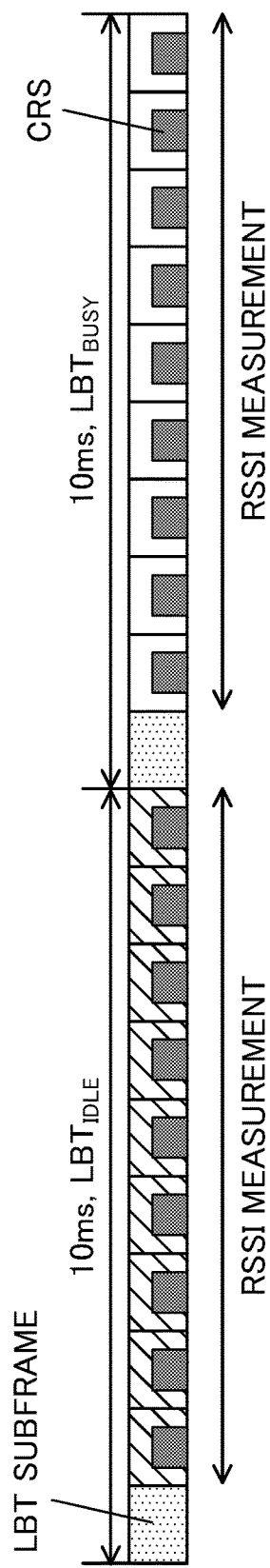
FIG. 6 provides diagrams for explaining RRM measurement.

FIG. 6A illustrates an example of CRS transmitted with periodicity of 1 [ms]. The frame length is 10 [ms] and the frame includes at least one LBT special subframe. The user terminal performs RSSI measurement in 9 [ms] subframes excluding the LBT special subframe.

Figure 6B:
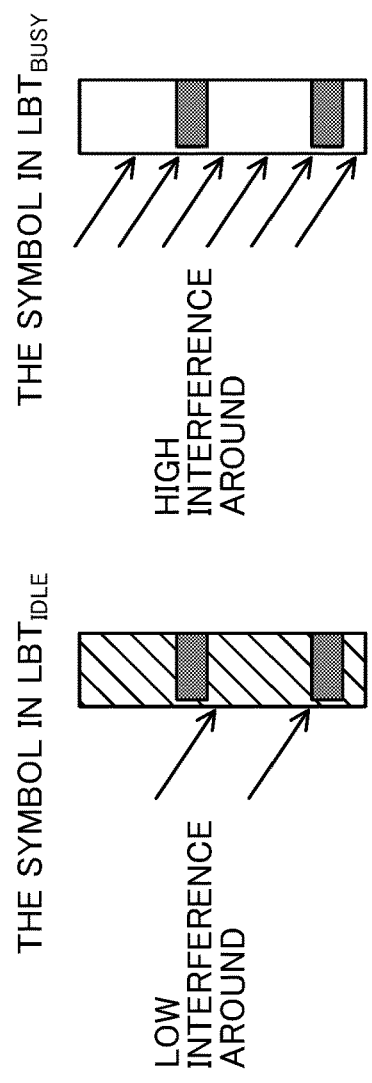

As illustrated in FIG. 6B, RSSI may vary depending on peripheral interference level. If the symbol is in the idle channel ($LBT_{idle}$), the interference level is low. If the symbol is in the idle channel ($LBT_{busy}$), the peripheral interference level becomes high. Accordingly, even when signals indicates the same RSSI values, the signal is strong in the $LBT_{idle}$ state, while the interference is high in the $LBT_{busy}$ state.

Thus, RSSI measurement has a problem that if RSSI measurement is performed irrespective of $LBT_{idle}$ state or $LBT_{busy}$ state, inaccurate measurement information is reported. For example, if RSSI is measured at any timing, it becomes difficult to derive RSRQ that reflects the state of the channel to transmit data actually. Accordingly, it is necessary to obtain RSSI appropriately in consideration of the LBT result.

Figure 7:
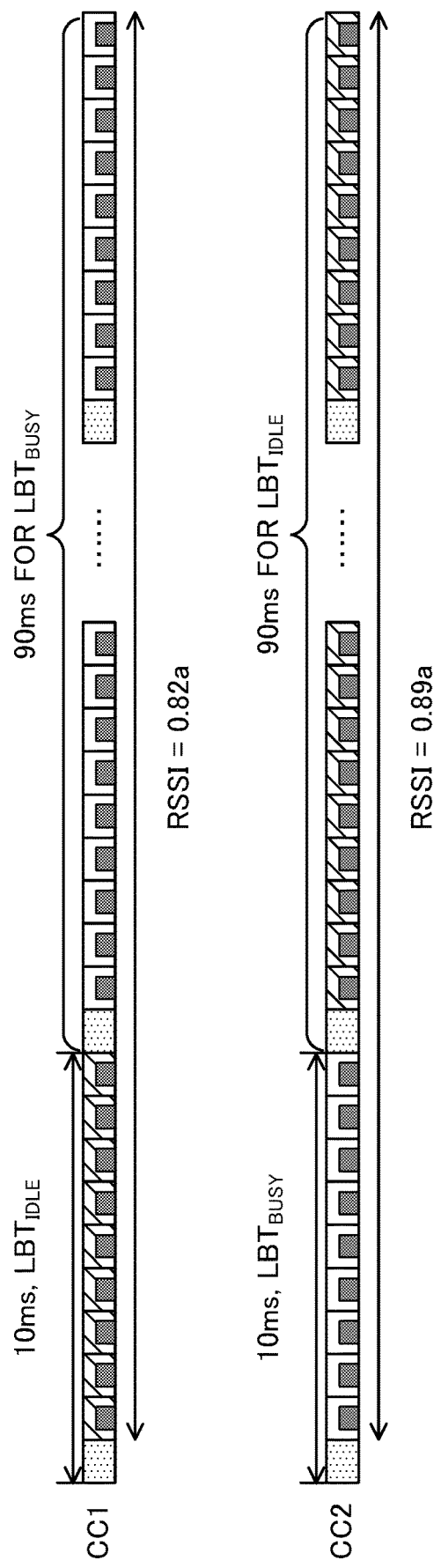
FIG. 7 is a diagram for explaining RRM measurement.

As illustrated in FIG. 7, there are examples of CC1 and CC2 having the same conditions other than the LBT result.

Assume that the user terminal measures the same RSRP value from the two CCs or channels. In the example of FIG. 7, RSSI of CC1 is 0.82a and RSSI of CC2 is 0.89a. Accordingly, RSRQ of CC1 becomes larger than RSRQ of CC2.

In this case, a conventional user terminal determines that CC1 is better than CC2. However, in fact, CC2 has more available resources in the idle state than CC1. When transmitting data actually, RSRQ of CC1 cannot be assured to be better than RSRQ of CC2. That is, determination based on RSRQ can be possibly incorrect.

Figure 8:
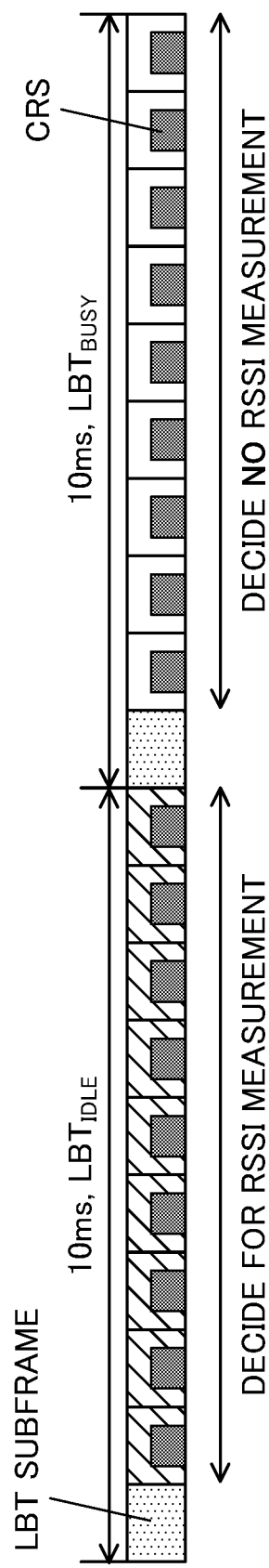
FIG. 8 is a diagram for explaining RRM measurement.

Then, the user terminal measures RSRQ (RSSI) only in the $LBT_{idle}$ subframe. Specifically, the user terminal detects the beacon reference signal (BRS) in the LBT special subframe or detects another reference signal in each subframe thereby to identify the channel is idle or busy. Then, the user terminal determines to measure RSSI only in the $LBT_{idle}$ subframe (see FIG. 8). Besides, the user terminal determines not to measure RSSI in the $LBT_{busy}$ subframe (see FIG. 8).

The user terminal reports RSRQ in the conventional method or extended method.

In the conventional method, regular reporting is configured by RRC (Radio Resource Control). Since measurement opportunity depends on the LBT result, if there are sufficient measurement opportunities or samples in a given period, the reporting may not be incorrect.

In the first extended method, reporting is performed only when the reporting is possible at regular reporting timing (opportunistic reporting). If there are not sufficient measurement samples before the regular reporting timing, the user terminal skips the regular reporting. The sufficient measurement samples can be M samples, symbols or subframes, and M may be configured by RRC signaling.

In the second extended method, reporting is performed only when it is possible at any timing (opportunistic reporting). The user terminal is able to start RSRQ reporting at any timing after measuring to obtain sufficient measurement samples. The reporting timing is not fixed. The sufficient measurement samples can be M samples, symbols or subframes, and M may be configured by RRC signaling.

Thus, according to RRM measurement, the user terminal measures and reports RSRQ in the $LBT_{idle}$ subframe, and thereby the base station is able to select an appropriate transmission parameter based on the quality of the channel in the $LBT_{idle}$ state in actual communication. Thus obtained accurate RSRQ is used together with a ratio of the channel in the $LBT_{idle}$ state in the base station (CCR: Channel Clear Ratio), and thereby appropriate cell selection is enabled (Scell addition/removal or handover). According to the opportunistic reporting, it is possible to assure accurate reporting results based on sufficient measurement samples.

Figure 9:
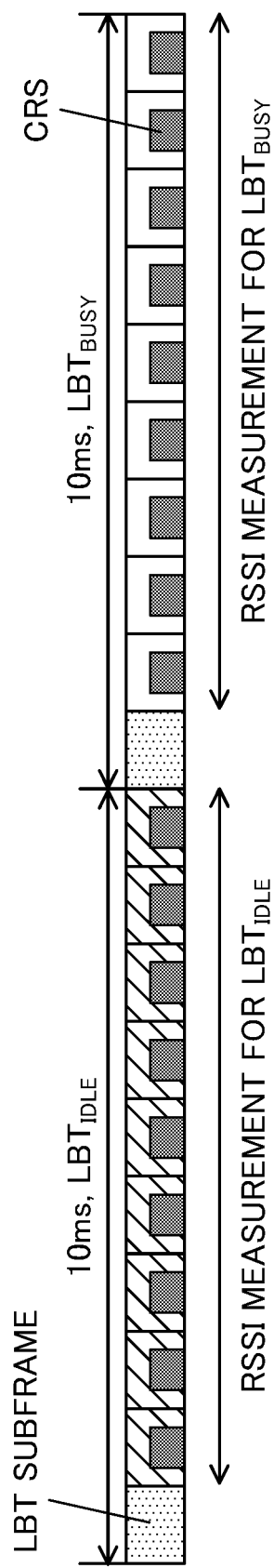
FIG. 9 is a diagram for explaining RRM measurement.

The user terminal may measure RSRQ (RSSI) in each of the $LBT_{idle}$ subframe and the $LBT_{busy}$ subframe. Specifically, the user terminal detects the beacon reference signal (BRS) in the LBT special subframe or detects another reference signal in each subframe thereby to identify whether the channel is idle or busy. Then, the user terminal determines to measure two RSSIs (see FIG. 9). These are $RSSI_{idle}$ measured in the $LBT_{idle}$ subframe and $RSSI_{busy}$ measured in the $LBT_{busy}$ subframe.

The user terminal reports two RSRQ measurement reports explicitly or implicitly when necessary. The user terminal is able to report RSRQs by the above-mentioned extended method. Explicit indication associated with each RSRQ may be used to indicate two RSRQs. Implicit indication may be made by the order of two RSRQs.

According to this RRM measurement, the user terminal is able to measure and report RSRQ in $LBT_{busy}$ separately, the base station is able to know a difference between measurement results at the user terminal when the channel is determined to be busy and when the channel is determined to be idle. With this structure, the base station performs transmission to the user terminal even when the channel is determined to be busy but the interference level is not high in the user terminal, thereby further solving the terminal problem.

CSI Measurement

Figure 10:
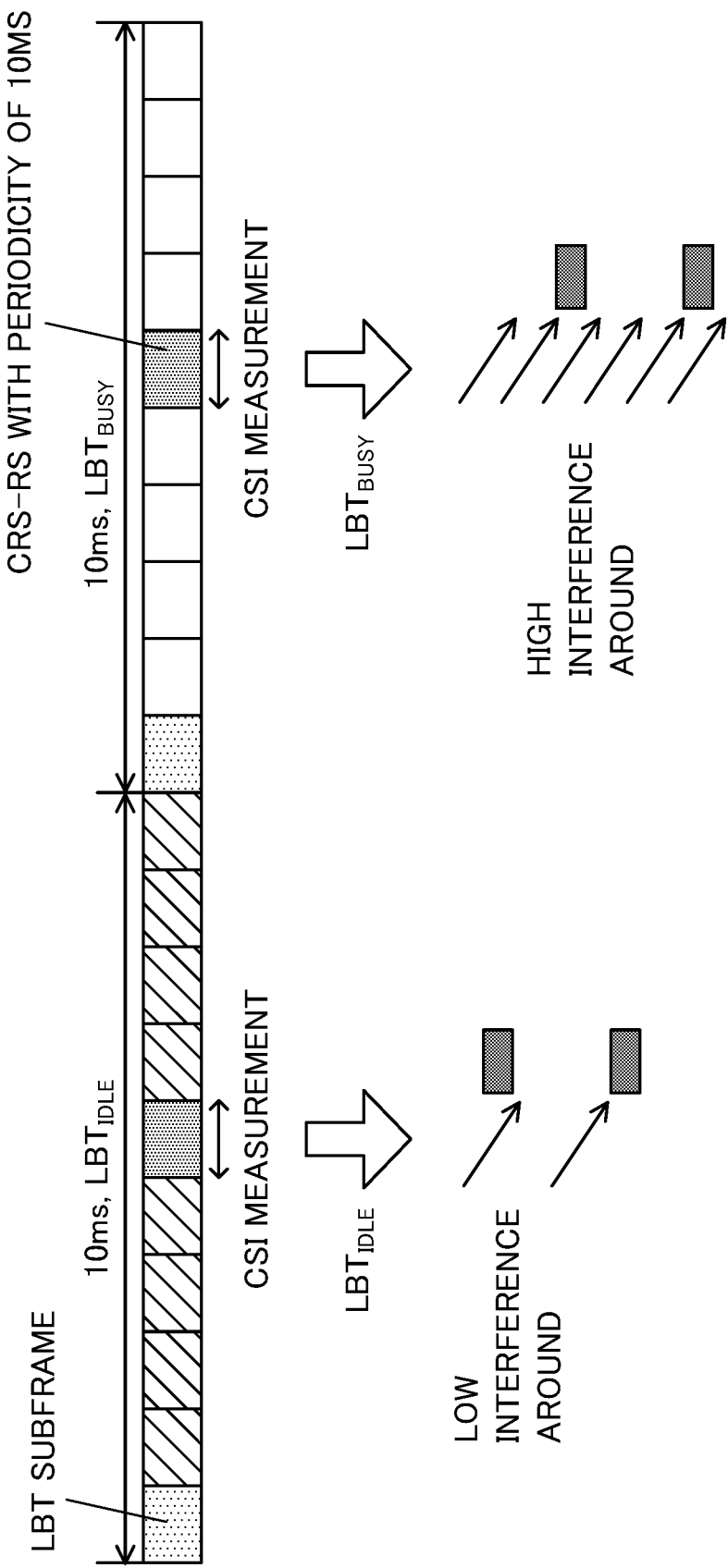
FIG. 10 is a diagram for explaining CSI measurement.

FIG. 10 is an example where CSI-RS is transmitted with periodicity of 10 [ms]. The flame length is 10 [ms] and the frame includes at least one LBT special subframe. The user terminal measures CSI-RS in a subframe where CSI-RS is transmitted. As for interference, an average interference level in a past period or an instantaneous interference level of the subframe to measure.

If CSI measurement is performed irrespective of whether the channel is in the $LBT_{idle}$ state or in the $LBT_{busy}$ state, inaccurate information may be reported problematically. For example, CSI measured by the conventional method may not indicate the state of a channel to transmit data actually.

Figure 11:
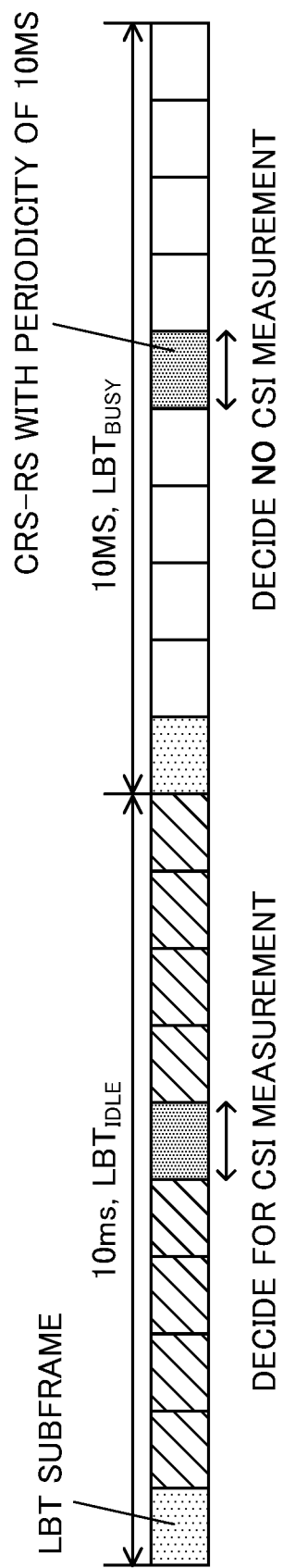
FIG. 11 is a diagram for explaining CSI measurement.

Then, the user terminal measures CSI only in the $LBT_{idle}$ subframe. Specifically, the user terminal detects the beacon reference signal (BRS) in the LBT special subframe or detects another reference signal in each subframe thereby to identify whether the channel is idle or busy. Then, the user terminal determines to measure CSI only in the $LBT_{idle}$ subframe (see FIG. 11). In addition, the user terminal determines not to measure CSI in the $LBT_{busy}$ subframe (see FIG. 11). When there is no measurement result of $LBT_{idle}$, the user terminal skips CSI measurement timing. In the carrier aggregation scenario, CSI may be reported by PCell using the licensed band.

According this CSI measurement, as the user terminal measures and reports CSI in the $LBT_{idle}$ state, the base station is able to configure an appropriate transmission parameter, for example, select a modulation and coding scheme (MCS), based on the channel quality in the idle state. Since there is no CSI measurement and reporting in $LBT_{busy}$ subframe, it is possible achieve power saving in the user terminal.

If there is a long period $LBT_{busy}$ state before changing to $LBT_{idle}$ state, the base station does not have an accurate CSI. When the $LBT_{busy}$ period is smaller than a threshold, the base station uses the latest CSI reporting to select the modulation and coding scheme (MCS). If the $LBT_{busy}$ period is greater than the threshold, the base station may use a conservative modulation and coding scheme.

Figure 12:
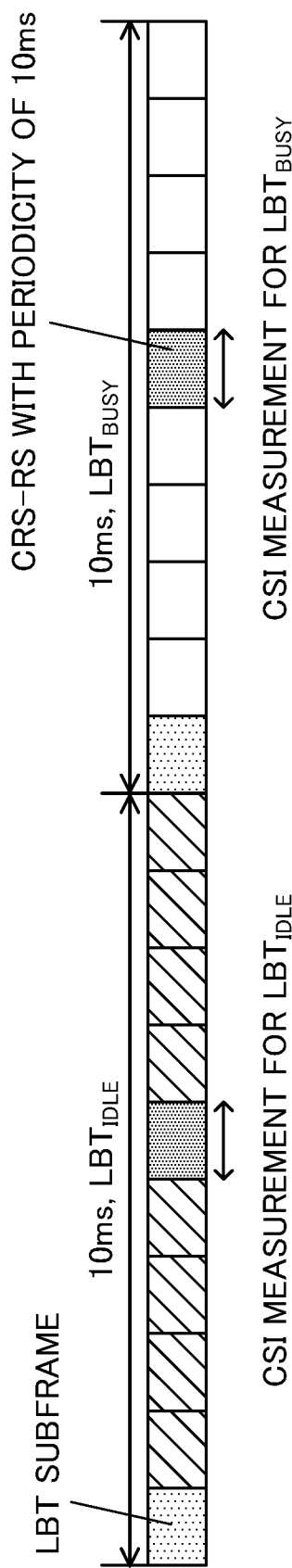
FIG. 12 is a diagram for explaining CSI measurement.

The user terminal may measure CSI in each of the $LBT_{idle}$ subframe and the $LBT_{busy}$ subframe. Specifically, the user terminal detects the beacon reference signal (BRS) in the LBT special subframe or detects another reference signal in each subframe thereby to identify whether the channel is busy or idle. Then, the user terminal determines to measure two CSIs (see FIG. 12). That is, the user terminal measures $CSI_{idle}$ in the $LBT_{idle}$ subframe and measures $CSI_{busy}$ in the $LBT_{busy}$ subframe.

The user terminal reports two CSI measurement results, where necessary. Explicit indication associated with each CSI may be used to indicate two CSIs.

In the $LBT_{idle}$ radio frame period, the user terminal measures and reports CSI in the $LBT_{idle}$ subframe. In the $LBT_{busy}$ radio frame period, the user terminal measures and reports CSI in the $LBT_{busy}$ subframe. Therefore, explicit indication is not required and the base station is able to know two CSIs at the respective reporting timings.

According to this CSI reporting, as the user terminal measures and reports CSI in the $LBT_{busy}$ subframe separately, the base station is able to know a difference in the measurement results in the user terminal when the base station determines the channel is busy and when the base station determines the channel state is idle. With this configuration, the base station performs transmission to the user terminal even when the channel is determined to be busy, but the interference in the user terminal is not high, thereby solving the terminal problem. If there is a long $LBT_{busy}$ period before changing into the $LBT_{idle}$ state, the base station may use the modulation and coding scheme (MCS) in the latest $LBT_{busy}$ subframe as the $CSI_{idle}$ is better than the $CSI_{busy}$.

Other Functions Based on Identified LBT Result

When the user terminal has identified the $LBT_{busy}$ state or when the $LBT_{busy}$ ratio is larger than a threshold, the user terminal may perform inter-frequency measurement for another carrier.

In order to avoid mismatch between the user terminal and the base station, a new event for triggering reporting may be defined. For example, when the user terminal is informed that the $LBT_{busy}$ ratio in the base station is larger than a threshold, the user terminal may report a result of inter-frequency measurement for another carrier to the base station.

(Configuration of Radio Communication System)

Next description is made about the configuration of a radio communication system according to the present embodiment. In this radio communication system, a radio communication method is applied in which LBT is carried out in the radio communication system (LAA) operating with the above-described unlicensed band.

Figure 13:
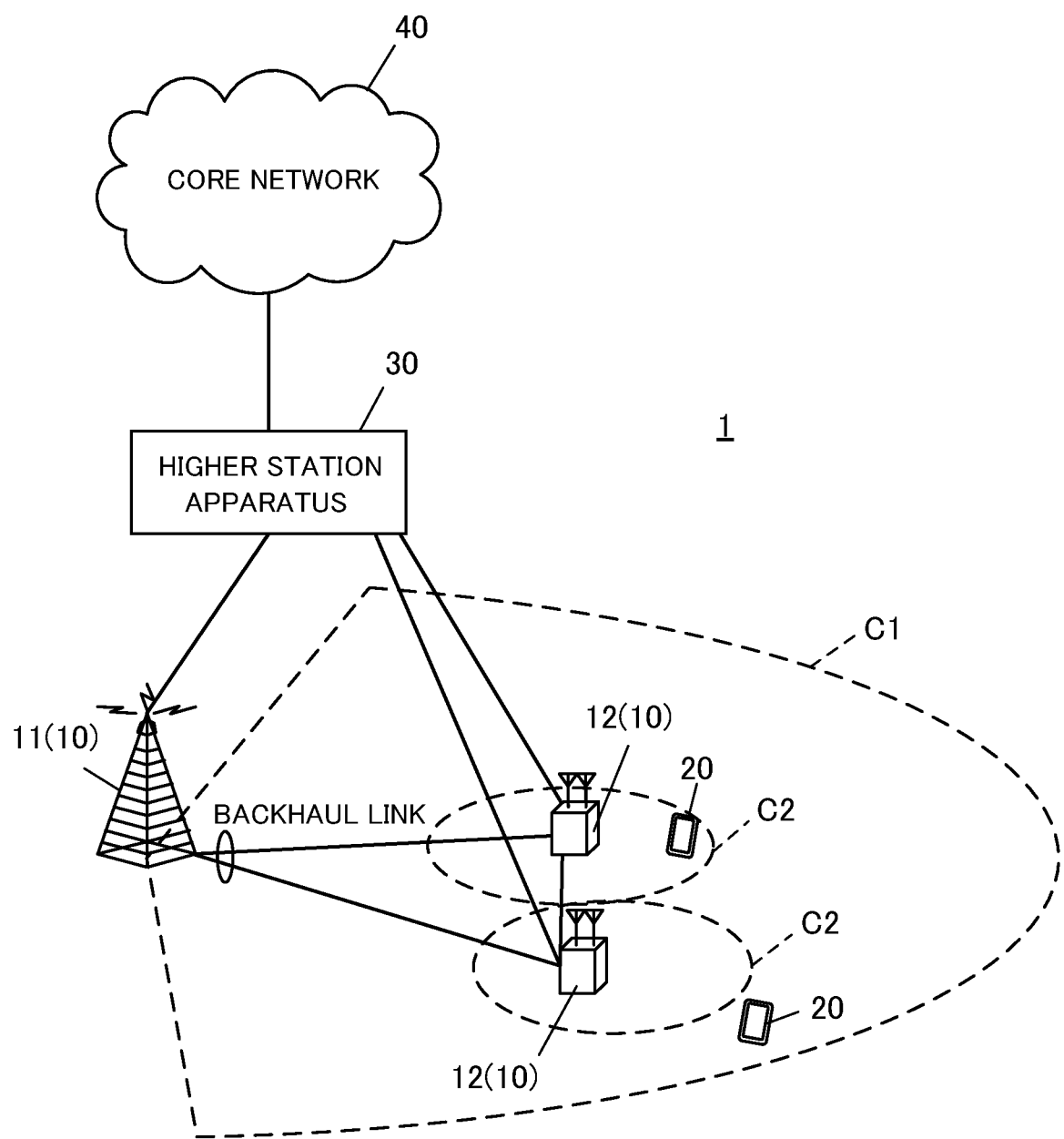
FIG. 13 is a diagram schematically illustrating an example of the configuration of a radio communication system according to an embodiment.

FIG. 13 is a diagram schematically illustrating the configuration of a radio communication system according to the present embodiment. The radio communication system illustrated in FIG. 13 is, for example, a system covering an LTE system, SUPER 3G. In this radio communication system, carrier aggregation or dual connectivity applies by aggregating a plurality of fundamental frequency blocks (component carriers), each component carrier corresponding to the system bandwidth of the LTE system. Besides, the radio communication system illustrated in FIG. 13 has an unlicensed band (LTE-U base station). This radio communication system may be called IMT-Advanced, 4G, FRA (Future Radio Access) or the like.

The radio communication system 1 illustrated in FIG. 13 has a radio base station 11 forming a macro cell C1 and radio base stations 12 each forming a small cell C2 that is smaller than the macro cell C1 and is located within the macro cell C1. In the macro cell C1 and the small cells C2, a user terminal 20 is located. For example, it can be configured that the macro cell C1 is used with a licensed band, each small cell C2 is used with an unlicensed band (LAA). It can be also configured that a part of the small cells C2 is used with a licensed band and the other C2 is used with an unlicensed band.

The user terminal 20 is able to be connected to both of the radio base station 11 and the radio base stations 12. The user terminal 20 is expected to use the macro cell C1 and small cell C2 of different frequencies simultaneously by CA or DC. For example, the radio base station 11 using the licensed band may transmit assist information (DL signal configuration) about the radio base station 12 (for example, LTE-U base station) using the unlicensed band to the user terminal 20. Further, when carrier aggregation is carried out with the licensed and unlicensed bands, one radio base station (for example, radio base station 11) may be configured to control scheduling of the licensed and unlicensed band cells.

The user terminal 20 and the radio base station 11 are able to perform communication with each other using a carrier of relatively low frequency band (for example, 2 GHz) and narrow bandwidth (called legacy carrier). On the other hand, the user terminal 20 and the radio base station 12 are able to perform communication with each other using a carrier of relatively high frequency band (for example, 3.5 GHz, 5 GHz or the like) and wide bandwidth or using the same carrier as that used in communication between the user terminal and the radio base station 11. Connection between the radio base station 11 and the radio base station 12 or between two radio base stations 12 may be wired connection (optical fiber, X2 interface or the like) or wireless communication.

Radio base stations 10 (the radio base station 11 and radio base stations 12) are each connected to a higher station apparatus 30 and also connected to a core network 40 via the higher station apparatus 30.

In FIG. 13, each radio base station 11 is, for example, formed as a macro base station having a relatively wide coverage, and forms the macro cell C1. The radio base station 12 is formed as a small base station having a local coverage and forms the small cell C2. The number of radio base stations 11 and the number of radio base stations 12 are not limited to those illustrated in FIG. 13.

The macro cell C1 and small cells C2 may use the same frequency band or may use different frequency bands. The radio base stations 11 and 12 are mutually connected to each other via an inter-base station interface (for example, optical fiber, X2 interface or the like).

Each user terminal 20 is a terminal supporting various communication schemes of LTE, LTE-A and the like, and may include not only a mobile communication terminal, but also a fixed communication terminal. The user terminal 20 is able to perform communication with another user terminal via the radio base station 10.

The higher station apparatus 30 includes, but is not limited to, for example, an access gateway apparatus, a radio network controller (RNC), mobility management entity (MME) and so on.

In the radio communication system 1, downlink channels as used include a downlink shared channel (PDSCH: Physical Downlink Shared Channel) used by each user terminal 20 on a shared basis, and downlink control channels (PDCCH: Physical Downlink Control Channel, EPDCCH: Enhanced Physical Downlink Control Channel), a broadcast channel (PBCH: Physical Broadcast Channel), and so on. PDSCH is used to transmit user data, higher layer control information, given SIB (System Information Block). PDCCH and EPDCCH are used to transit downlink control information (DCI).

In the radio communication system 1, the uplink channels include a PUSCH (Physical Uplink Shared Channel), which is an uplink shared channel used by each user terminal 20 on a shared basis, and an uplink control channel (PUCCH: Physical Uplink Control Channel) and so on. The PUSCH is used to transmit user data and higher layer control information.

Figure 14:
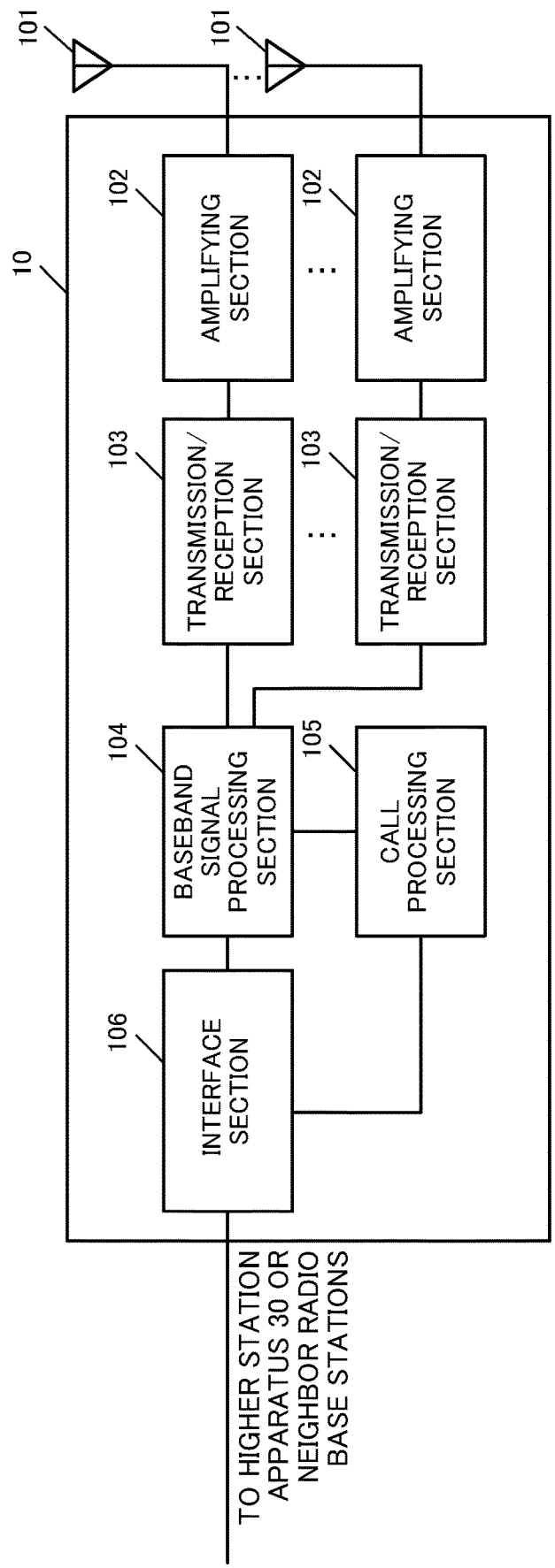
FIG. 14 is a diagram schematically illustrating an example of the overall configuration of a radio base station according to the embodiment of the present invention.

FIG. 14 is a diagram of an overall configuration of the radio base station 10 (including the radio base stations 11 and 12) according to the present embodiment. As illustrated in FIG. 14, the radio base station 10 has a plurality of transmission/reception antennas 101 for MIMO transmission, amplifying sections 102, transmission/reception sections 103, a baseband signal processing section 104, a call processing section 105 and an interface section (transmission path interface) 106.

User data that is transmitted on the downlink from the radio base station 10 to the user terminal 20 is input from the higher station apparatus 30, through the interface section 106, into the baseband signal processing section 104.

In the baseband signal processing section 104, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing. Then, the resultant signals are transferred to each transmission/reception section 103. As for downlink control signals, transmission processing is performed, including channel coding and inverse fast Fourier transform, and the resultant signals are transmitted to each transmission/reception section 103.

Also, the baseband signal processing section 104 transmits, to each user terminal 20, control information (system information) for communication in the cell by higher layer signaling (for example, RRC signaling, broadcast information or the like). Information for communication in the cell includes, for example, uplink system bandwidth, downlink system bandwidth and so on.

Further, in the licensed band, the radio base station (for example, radio base station 11) may transmit, to the user terminal 20, assist information about the unlicensed band communication (for example, DL TPC information or the like).

In each transmission/reception section 103, downlink signals which are precoded per antenna and output from the baseband signal processing section 104 are subjected to frequency conversion processing into a radio frequency band. The radio frequency signals having been subjected to frequency conversion are amplified by the amplifying section 102, and the resultant signals are transmitted from the transmission/reception antenna 101. The transmission/reception section 103 may be configured of a transmitter/receiver, transmission/reception circuit or transmission/reception apparatus that is explained based on common knowledge in the technical field to which the present invention pertains.

Meanwhile, as for uplink signals, radio frequency signals are received in each transmission/reception antenna 101, and amplified in the amplifying section 102. The uplink signals amplified in the amplifying section 102 are received by the transmission/reception section 103. In the transmission/reception section 103, reception signals are subjected to frequency conversion and converted into baseband signals, and are input to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on the user data included in the received uplink signals. Then, the resultant signals are transferred to the higher station apparatus 30 through the interface section 106. The call processing section 105 performs call processing such as setting up and releasing a communication channel, manages the state of the radio base station 10 and manages the radio resources.

The interface section 106 transmits and receives signals to and from a neighbor radio base station via an inter-base station interface. The interface section 106 may perform transmission and reception of signals with a neighbor radio base station via inter-base station interface (for example, optical fiber, X2 interface) (backhaul signaling). Or, the interface section 106 performs signal transmission and reception with the higher station apparatus 30 via given interface.

Figure 15:
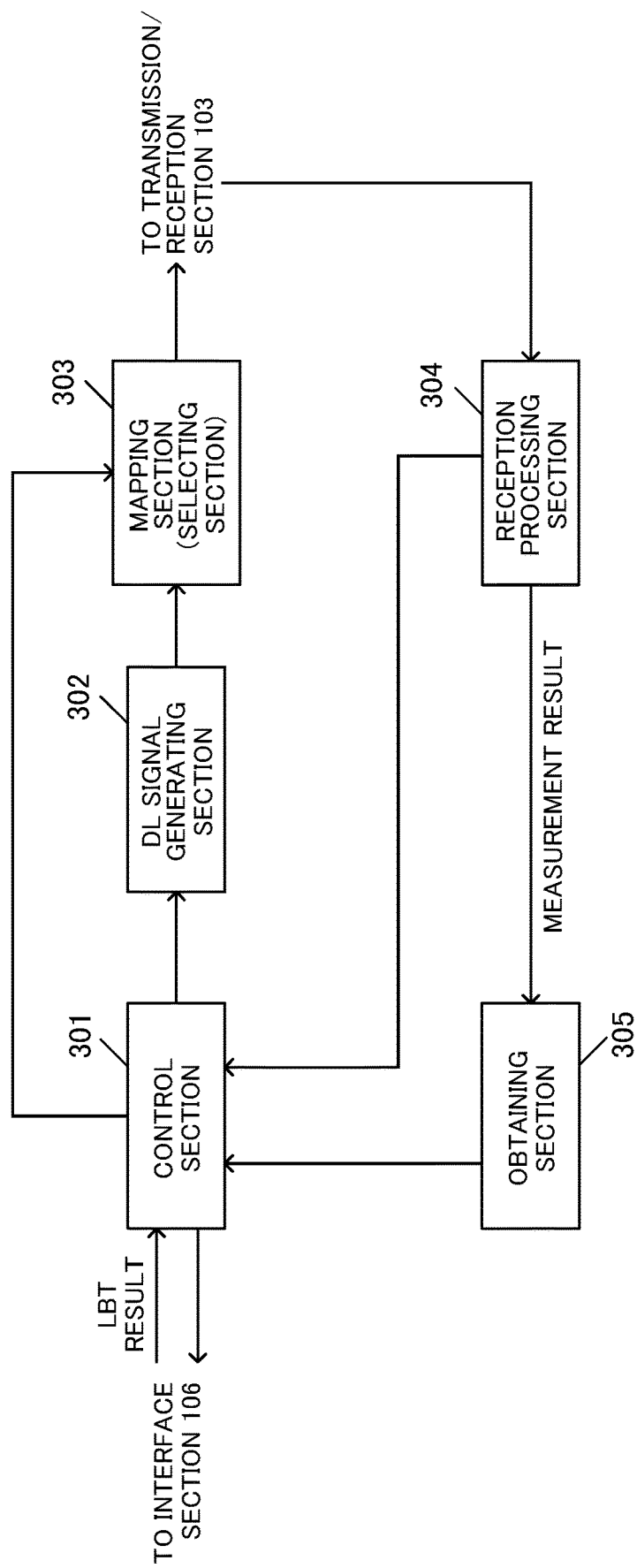
FIG. 15 is a diagram schematically illustrating an example of the functional configuration of the radio base station according to the embodiment.

FIG. 15 is a diagram illustrating a functional structure of the radio base station 11 according to the present embodiment. In the following, the functional structure is formed of the baseband signal processing section 104 provided in the radio base station 11 and so on. The functional structure in FIG. 15 is mainly of featuring parts according to the present embodiment, however the radio base station 11 may also have other functional blocks required for radio communication as well.

As illustrated in FIG. 15, the radio base station 11 is configured to include a control section (scheduler) 301, a DL signal generating section 302, a mapping section 303, a reception processing section 304 and an obtaining section 305.

The control section (scheduler) 301 controls scheduling of downlink data signals to be transmitted by PDSCH and downlink control signals to be transmitted by PDCCH or enhanced PDCCH (EPDCCH). Besides, the control section 301 controls scheduling of downlink reference signals such as CSI-RS, CRS, system information and synchronization signals. When the licensed band and the unlicensed band are scheduled by one control section (scheduler) 301, the control section 301 controls transmission of DL signals transmitted in the licensed band cell and unlicensed band cell.

The control section 301 controls allocation of radio resources to the downlink signals and uplink signals based on feedback information from each user terminal 20 and instruction information from the higher station apparatus 30. That is, the control section serves as a scheduler. The control section 301 may be a controller, a control circuit or a control device that is explained based on common recognition in the technical field to which the present invention pertains.

When controlling the transmission in the unlicensed band, the control section 301 controls transmission of DL signals in the unlicensed band based on an LBT result performed in the unlicensed band. In this case, the LBT result performed in the unlicensed band cell is output to the control section 301. For example, when DL transmission in the unlicensed band cell is performed from a different transmission point (for example, RRH) from that in the licensed band cell, the LBT result is transmitted to the control section 301 via the backhaul link. When DL transmission in the unlicensed band cell is performed from the same transmission point as that in the licensed band cell, the reception processing section 304 may perform an LBT and reports it LBT result to the control section 301.

As the LBT result in the unlicensed band, when the control section 301 determines that a channel in the unlicensed band is in the idle state from a measurement result of reception signal strength, the control section 301 controls to transmit BRS in all candidate symbols after the symbol to execute LBT (LBT execution symbol). When the control section 301 determines that the channel in the unlicensed band is in the idle state, the control section 301 controls to transmit DL signals using the unlicensed band. Then, the control section 301 instructs, by using the licensed band, the user terminal 20 to measure a DL signal transmitted in the unlicensed band (measurement) and to report a measurement result as a feedback. Specifically, the control section 301 instructs the DL signal generating section 301 to generate information about the instruction to measure in the unlicensed band and the instruction of feedback of the measurement result.

The DL signal generating section 302 generates DL signals based on the instruction from the control section 301. The DL signals include a DL data signal, a downlink control signal, a reference signal and so on. When a DL signal is transmitted in the unlicensed band based on an LBT result, the DL signal generating section 302 includes information about the instruction to measure in the unlicensed band and the information to feed back a measurement result, in a downlink control signal to be transmitted in the licensed band.

The mapping section 303 controls mapping of DL signals based on the instruction from the control section 301. The mapping section 303 serves as a selecting section and controls mapping by selecting a symbol to execute LBT from a plurality of candidate symbols randomly with even probability. The mapping section 303 is configured of a mapping circuit or a mapper that is explained based on common knowledge in the technical field to which the present invention pertains.

The reception processing section 304 performs reception processing including, for example, decoding and demodulation, on UL signals transmitted from the user terminal 20. When detecting a measurement report transmitted from the user terminal 20 via the licensed band, the reception processing section 304 outputs it to the obtaining section 305.

The obtaining section 305 obtains a measurement result measured in the unlicensed band. The obtaining section 305 outputs the measurement result (measurement report) to the control section 301 and the control section 301 controls the unlicensed band cell to transmit DL data to the user terminal based on the measurement result.

Figure 16:
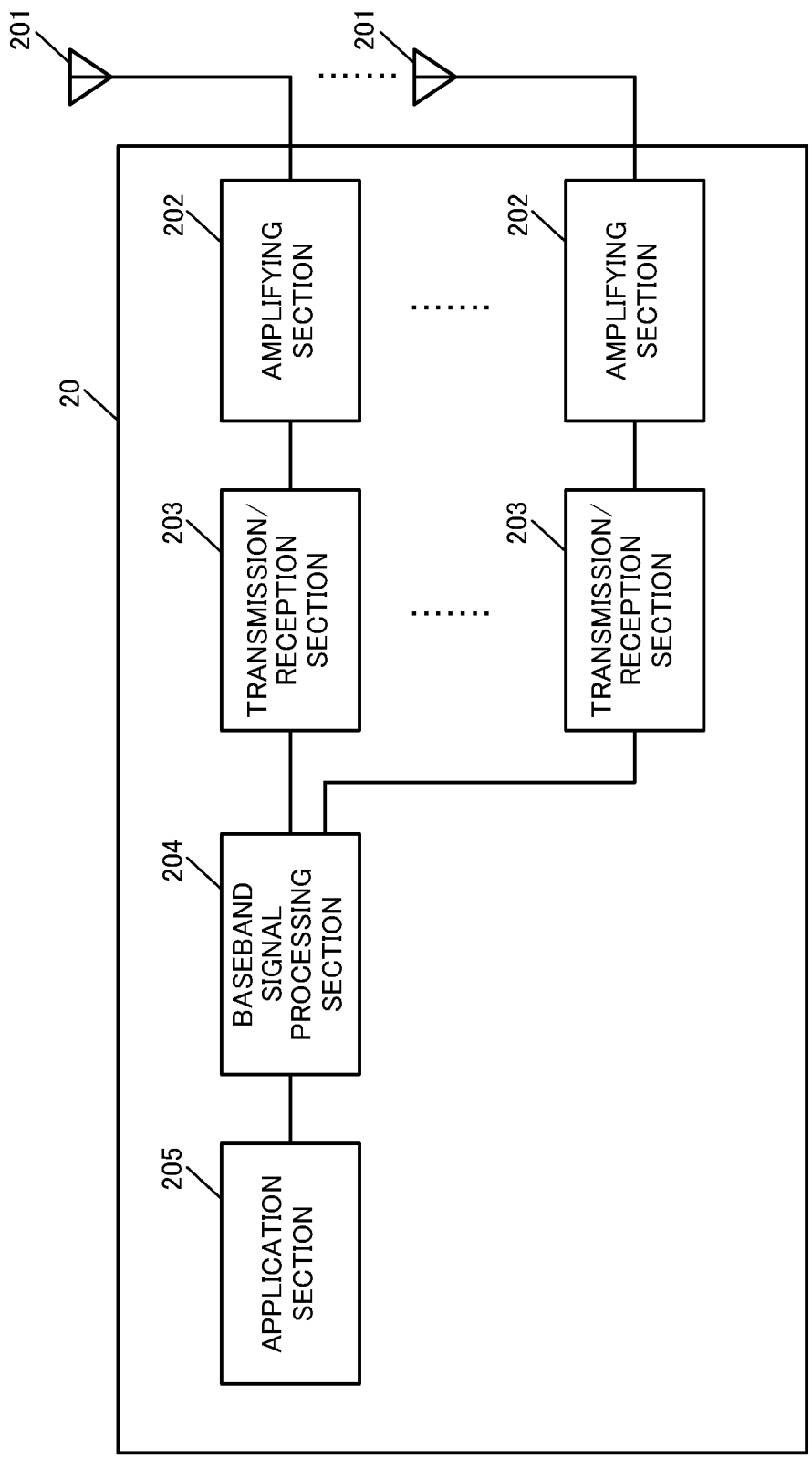
FIG. 16 is a diagram schematically illustrating an example of the overall configuration of a user terminal according to the embodiment.

FIG. 16 is a diagram of an overall configuration of the user terminal 20 according to the present embodiment. As illustrated in FIG. 16, the user terminal 20 has a plurality of transmission/reception antennas 201 for MIMO transmission, amplifying sections 202, transmission/reception sections 203, a baseband signal processing section 204 and an application section 205.

As for downlink data, radio frequency signals are received in the transmission/reception antennas 201 and are amplified in the respective amplifying sections 202, and subjected to frequency conversion into baseband signals in the transmission/reception sections 203. Then, the baseband signals are outputs to the baseband signal processing section 204, in which the baseband signals are subjected to reception processing such as FFT processing, error correction decoding and retransmission control and the like. In this downlink data, downlink user data is transferred to the application section 205. The application section 205 performs processing related to higher layers above the physical layer and the MAC layer. In the downlink data, broadcast information is also transferred to the application section 205.

On the other hand, uplink user data is input from the application section 205 to the baseband signal processing section 204. In the baseband signal processing section 204, retransmission control (H-ARQ: Hybrid ARQ) transmission processing, channel coding, precoding, DFT processing, DFT (Discrete Fourier Transform) processing, IFFT processing and so on are performed, and the resultant signals are transferred to each transmission/reception section 203. In the transmission/reception section 203, the baseband signals output from the baseband signal processing section 204 are converted into a radio frequency band. After that, the frequency-converted radio frequency signals are amplified in the amplifying section 202, and then, transmitted from the transmission/reception antenna 201.

Each transmission/reception section 203 is able to receive DL signals from the licensed and unlicensed bands. The transmission/reception section 203 is able to transmit UL signals at least in the licensed band. The transmission/reception section 203 may be configured to be able to transmit UL signals also in the unlicensed band. Further, the transmission/reception section 203 serves as a reception section configured to receive information about the measurement instruction in the unlicensed band and the feedback instruction of a measurement result by using the licensed band. The transmission/reception section 203 serves as a transmission section configured to transmit RRM measurement and CSI measurement results. The transmission/reception section 203 may be configured of a transmitter/receiver, a transmission/reception circuit or a transmission/reception apparatus that is explained based on common knowledge in the technical field to which the present invention pertains.

Figure 17:
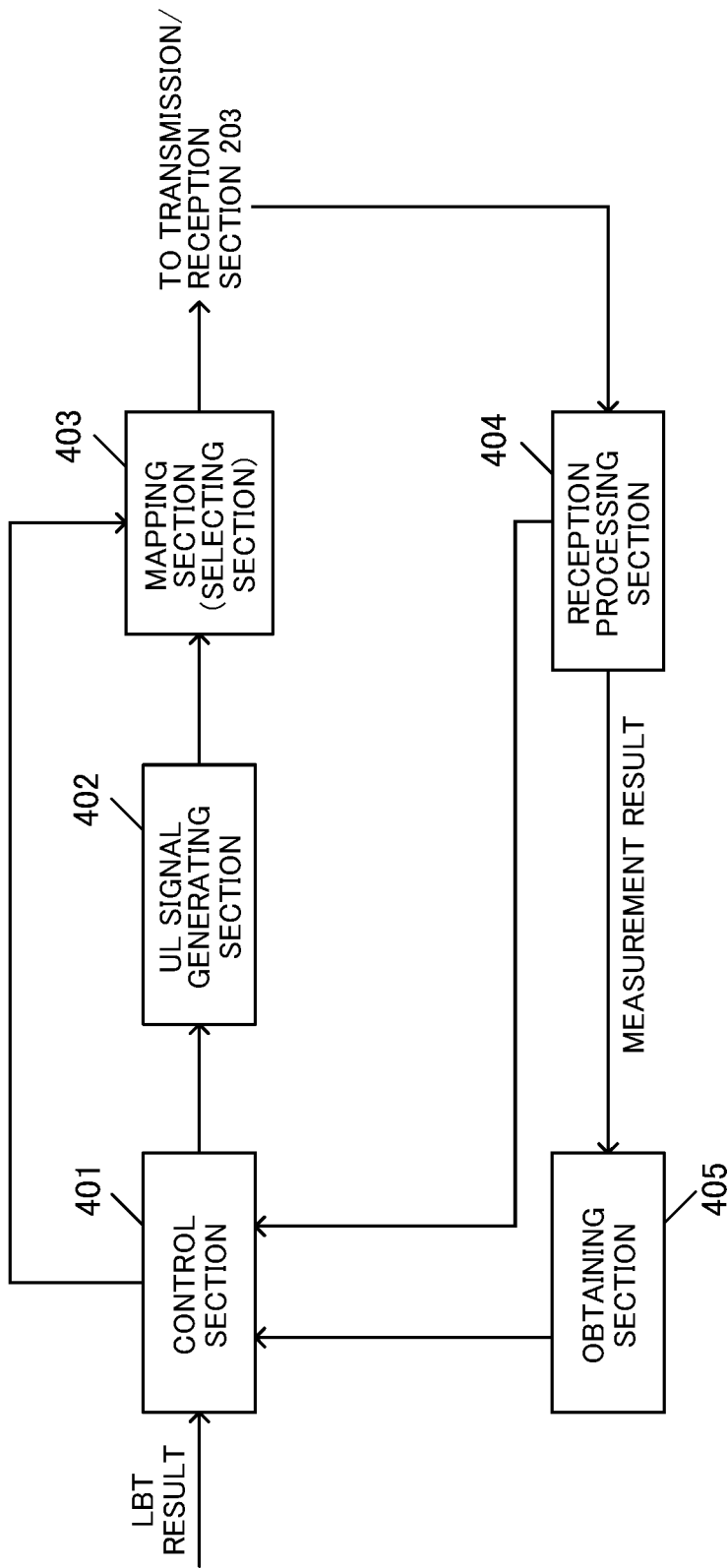
FIG. 17 is a diagram schematically illustrating an example of the functional configuration of the user terminal according to the embodiment.

FIG. 17 is a diagram illustrating a functional structure of the user terminal 20 according to the present embodiment. In the following, the functional structure is formed of the baseband signal processing section 204 provided in the user terminal 20 and so on. The functional structure in FIG. 17 is mainly of featuring parts according to the present embodiment, however the user terminal 20 may also have other functional blocks required for radio communication as well.

As illustrated in FIG. 17, the user terminal 20 has a control section 401, a UL signal generating section 402, a mapping section 403, a reception processing section 404 and an obtaining section 405.

The control section 401 controls transmission processing of UL signals to the radio base station 10 (including reporting of a measurement result). When detecting a beacon reference signal (BRS) of a connecting cell, the control section 401 recognizes that the channel of the connecting cell is in the idle state ($LBT_{idle}$) and controls to perform RRM measurement or CSI measurement in the $LBT_{idle}$ subframe.

When not detecting the beacon reference signal (BRS) of the connecting cell, the control section 401 recognizes that the channel of the connecting cell is in the busy state ($LBT_{busy}$) and controls not to perform RRM measurement or CSI measurement in the $LBT_{busy}$ subframe. Or, when not detecting the beacon reference signal (BRS) of the connecting cell, the control section 401 recognizes that the channel of the connecting cell is in the busy state ($LBT_{busy}$) and controls to perform RRM measurement or CSI measurement in the $LBT_{busy}$ subframe.

The control section may be configured of a controller, a control circuit or a control device that is explained based on common knowledge in the technical field to which the present invention pertains.

The UL signal generating section 402 generates a UL signal based on the instruction from the control section 401. When transmitting the UL signal in the unlicensed band based on the LBT result, the UL signal generating section 402 includes information about the measurement instruction in the unlicensed band and the feedback instruction of a measurement result in an uplink control signal to be transmitted in the licensed band. The UL signal generating section 402 may be configured of a signal generator or a signal generating circuit that is explained based on common knowledge in the technical field to which the present invention pertains.

The mapping section 403 controls mapping of UL signals based on the instruction from the control section 401. The mapping section 403 serves as a selecting section and controls mapping by selecting a symbol to execute LBT from a plurality of candidate symbols randomly and with even probability. The mapping section 403 may be configured of a mapping circuit or a mapper that is explained based on common knowledge in the technical field to which the present invention pertains.

The reception processing section 404 performs reception processing including decoding and demodulation on DL signals transmitted in the licensed band and unlicensed band.

The obtaining section 405 obtains a measurement result of measurement in the unlicensed band. The obtaining section 405 outputs the measurement result (measurement report) to the control section 401 and the control section 401 controls the unlicensed band cell to transmit the UL data based on the measurement result.

The present invention is not limited to the above-described embodiments, but may be embodied in various modified forms. In the above embodiments, the size, dimension and shape illustrated in the accompanying drawings are not intended to limit the present invention and may be changed appropriately as far as the effect of the present invention can be exerted. Other modifications and corrections may be also possible without departing from the scope of the present invention.

The disclosure of Japanese Patent Application No. 2014-156894 filed on Jul. 31, 2014, including the specification, drawings, and abstract, is incorporated herein by reference in its entirety.

The invention claimed is:

1. A user terminal that communicates via a Licensed-Assisted Access (LAA) cell supporting Listen Before Talk (LBT), the user terminal comprising:
    a processor that, when the LBT is applied, determines whether or not to perform channel state information (CSI) measurement to measure a reception quality in accordance with occupancy of a channel indicated by a detection result of Cell-specific Reference Signal (CRS) in the LAA cell; and
    a transmitter that, in the case when the processor performs the CSI measurement while the LBT is applied, transmits CSI obtained by the CSI measurement,
    wherein the CRS is transmitted in each subframe and includes an ID of the LAA cell.
2. The user terminal according to claim 1, wherein the processor skips the CSI measurement in a subframe if the detection result of CRS does not indicate the channel idle.
3. The user terminal according to claim 1, wherein, in the case when the processor performs the CSI measurement, the user terminal reports the CSI on a PCell using a licensed band.

* * * * *